Patented May 24, 1932

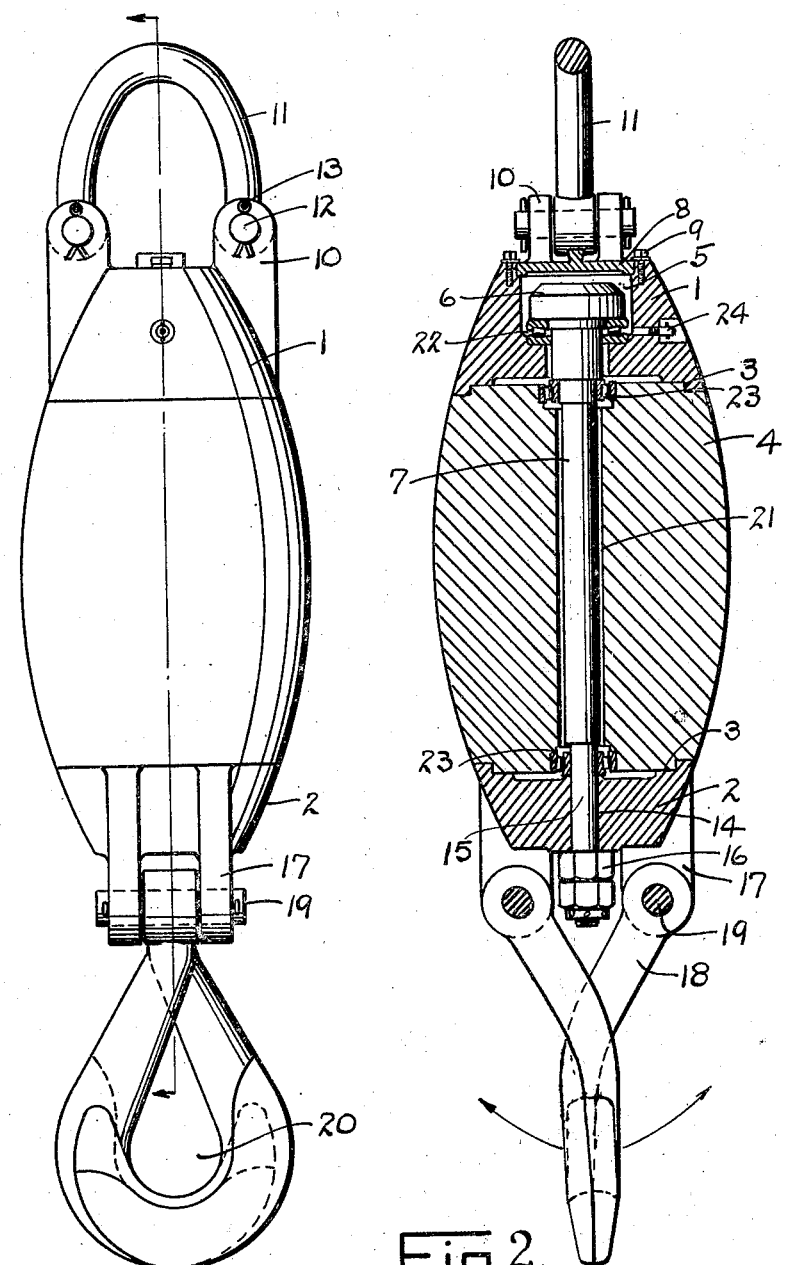

1,860,121

UNITED STATES PATENT OFFICE

WALTER C. TROUT, OF LUFKIN, TEXAS

WEIGHTED ROD LINE SWIVEL

Application filed November 1, 1930. Serial No. 492,735.

My invention relates to swivels for use in rod lines, and has particular application to oil field operations wherein the rods connected with pumping operations may be handled.

It is an object of the invention to provide a rod line swivel, which has a weight thereon so that the swivel may be employed in increasing the weight of the travelling block and lines so that the tackle will drop after a load of rods has been raised and placed in position.

It is another object of the invention to provide a swivel of this character, in which the swivel and weight are assembled for easy operation and in which the body of the swivel is made in streamline form so that it will not engage with and hang onto obstructions which may be encountered in operating the device. It is desired that the swivel be free to operate in the derrick without damage to the swivel or to the other parts of the apparatus.

The invention lies particularly in the construction of this swivel whereby a free swivel action is obtained and in which the weighted swivel is shaped so as not to impede the free use of the device.

In the drawings herewith Fig. 1 is a side elevation of a rod line swivel constructed in accordance with my invention.

Fig. 2 is a central longitudinal section showing the interior structure of the device.

The swivel includes an upper cap 1 and a lower cap 2, both of which are formed with cup-shaped recesses 3 on their inner faces to engage about an intermediate weight 4.

The upper cap 1 is formed with an axial recess 5 to receive the head 6 of the swivel bolt 7. The recess 5 is closed at its upper end by a plate 8 held in position by cap screws 9. At each side of the central recess 5 are longitudinally extending lugs 10, which are forked to receive between them the ends of the bail 11. Said bail is pivoted upon transverse pins 12 held in position by cotter pins 13.

The lower cap 2 is provided with a longitudinal opening 14 to receive the reduced end 15 of the swivel bolt 7. The nuts 16 on the lower end of the pin holds the same in adjusted position. Said lower cap has two pairs of downwardly extending lugs 17 spaced apart to receive hooks 18, which are pivoted upon pins 19 in said lugs. As will be seen from the drawings the opposite hooks 18 are bent toward each other and have their hooked ends flattened to engage upon the opposite side of the adjacent hook, thus when the hooks are depending by gravity from their supports the flattened faces of the hooks engage each other so as to form an opening 20 between them to receive the member which is to be attached thereto. This is a form of safety hook, which in itself forms no part of the invention.

The central swivel pin 7, which extends through from one plate to another is received within an axial opening 21 in the weight member 4. The parts of the device are intended to be freely rotatable relative to the swivel pin, and for that reason I have shown a roller bearing 22 between the head of the pin and the lower end of the recess or socket 5. I also form lateral thrust bearings 23 at the upper and lower ends of the weight, said bearings fitting within the recesses in the ends of the weight, as will be apparent from Figure 2.

To lubricate these bearings a grease cap 24 may be formed connecting with a passage leading to the recess 5. It will be seen that lubricant forced into this recess will lubricate the bearings 22, and will flow downwardly to the bearings 23 at each end of the weight. The cupped engagement between the two end caps and the weight assists in preventing the escape of lubricant laterally. In the handling of my rod line swivel, the device will be frequently raised and lowered in the derrick, but due to the streamline form of the swivel and the weight, it will not engage and hang up in obstructions in the derrick. Furthermore, the particular construction of the swivel allows for a free rotative movement of one end cap relative to the other so that the lines will not become twisted in handling the device.

The weight upon the swivel will assist in bringing the block and line down for attachment to the rods after a section of the rods have been raised and placed in position.

Having thus described the invention, what I seek to secure by Letters Patent is:

1. A combination rod line swivel and safety hook including a weight portion, a center bolt disposed therein, upper and lower cap members on said weight portion, a bail connected to said upper cap, a safety hook connected to said lower cap, and bearing supports for said center bolt.

2. A rod line weight including a body portion, caps rotatably mounted with respect to each end of said body, means connecting said caps through said body, and additional connecting means on each of said caps.

3. A combination rod line weight, swivel and hook including a hook, a cap connected thereto, a body portion streamlined with respect to said cap, another cap on the opposite end of said body also streamlined therewith, a center bolt passing through said body caps, and a bail on said last cap to support the device, said caps and said body being rotatably mounted with respect to each other.

4. A device of the character described including a streamlined weight, a hook at one end thereof, a bail at the opposite end, a separate center bolt in said weight and a swivel bearing between said bolt and said weight.

5. In a device of the character stated upper and lower caps, a bolt swivelly connecting said caps, a weight between said caps, a bail on said upper cap, a safety hook on said lower cap, said cap and weights being streamlined from end to end.

In testimony whereof I hereunto affix my signature this 27th day of October, A. D. 1930.

WALTER C. TROUT.